UNITED STATES PATENT OFFICE.

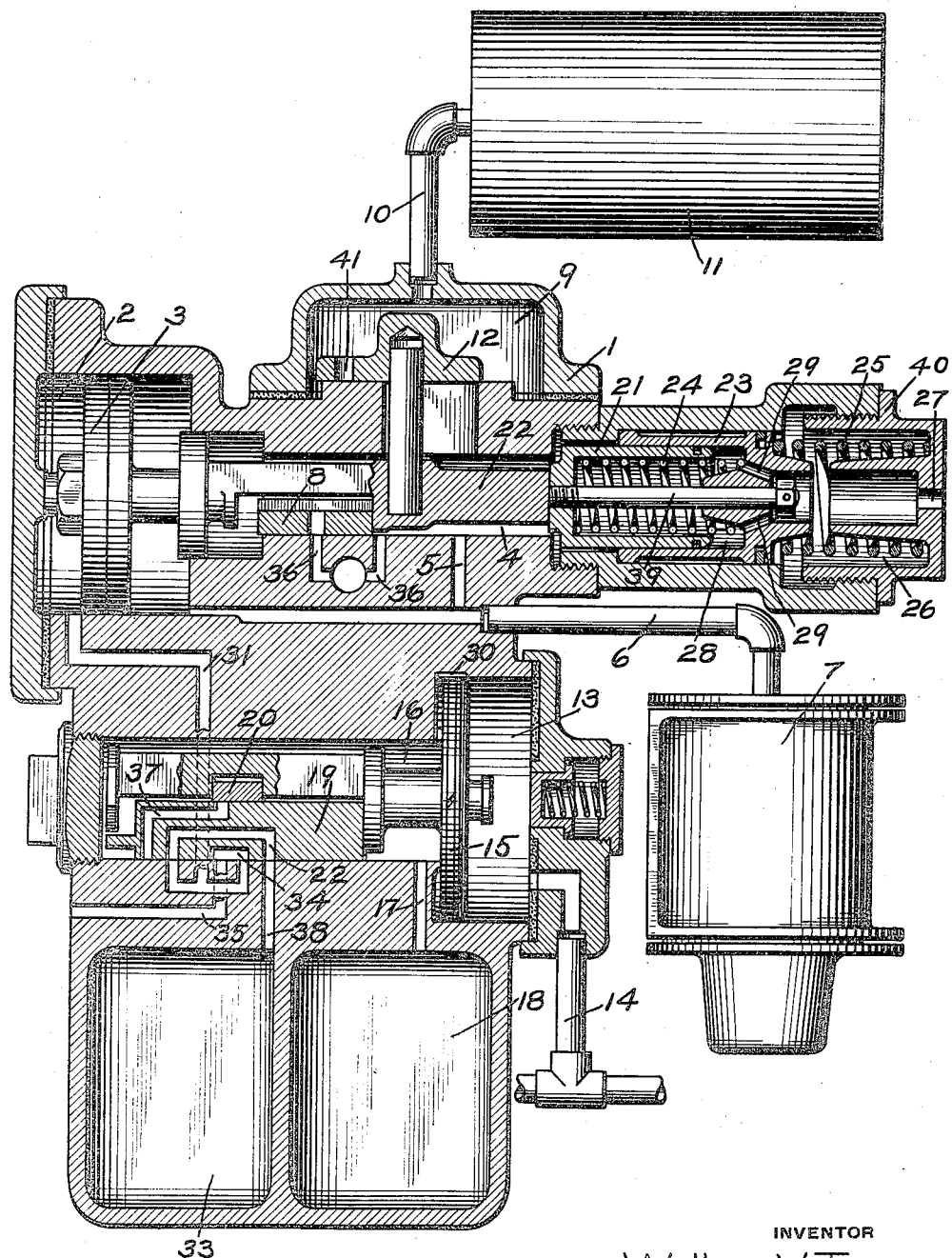

WALTER V. TURNER, OF WILKINSBURG, PENNSYLVANIA, ASSIGNOR TO THE WESTINGHOUSE AIR BRAKE COMPANY, OF WILMERDING, PENNSYLVANIA, A CORPORATION OF PENNSYLVANIA.

FLUID-PRESSURE BRAKE DEVICE.

1,297,520. Specification of Letters Patent. Patented Mar. 18, 1919.

Application filed April 8, 1918. Serial No. 227,179.

*To all whom it may concern:*

Be it known that I, WALTER V. TURNER, a citizen of the United States, residing at Wilkinsburg, in the county of Allegheny and State of Pennsylvania, have invented new and useful Improvements in Fluid-Pressure Brake Devices, of which the following is a specification.

This invention relates to fluid pressure brakes, and more particularly to a locomotive brake controlling valve device.

It has heretofore been proposed to provide a valve device for controlling the brakes on the locomotive, in which the supply and release of fluid under pressure to and from the locomotive brake cylinders is controlled by a piston subject to the opposing pressures of the brake cylinder and an application chamber.

With a valve device of the above character, the brake cylinder pressure, in applying the brakes, rises more rapidly than is the case with the usual triple valve device, as employed on cars, so that when the brakes are applied, the brakes have a tendency to apply on the locomotive before they are applied on the train, which is apt to result in a too violent running in of the slack.

The principal object of my invention is to provide improved means for delaying or retarding the application of the brakes on the locomotive, so as to overcome the above difficulty.

In the accompanying drawing, the single figure is a central sectional view of a locomotive brake controlling valve device embodying my invention.

According to the construction shown in the drawing, the valve device may comprise a casing 1 having a piston chamber 2 containing a brake application and release piston 3, a valve chamber 4 connected by passage 5 and pipe 6 to brake cylinder 7 and containing a brake release valve 8, and a valve chamber 9, connected by pipe 10 to main reservoir 11, and containing a supply valve 12, the valves 8 and 12 being operated by the piston 3.

The casing 1 also has a piston chamber 13 connected to brake pipe 14 and containing an equalizing piston 15, and a valve chamber 16 connected by passage 17 with a pressure chamber 18 and containing a main slide valve 19 and a graduating slide valve 20 adapted to be operated by piston 15.

According to my invention, the movement of the application and release piston is opposed by a spring stop device comprising a piston 21 adapted to engage the piston stem 22 of piston 3 and mounted in a second piston 23.

Interposed between the pistons 21 and 23 is a coil spring 24 and a coil spring 25 opposes the outward movement of piston 23.

The chamber 26 containing spring 25 is open to the atmosphere through a port 27 and spring chamber 28 is open to chamber 26 through ports 29 in piston 23.

The pistons 21 and 23 are held together, with the spring 24 under initial compression, by means of a bolt 39, secured to piston 21 and adapted to work freely in a bore arranged centrally in the piston 23, and the spring 25 is initially compressed when the parts are installed by screwing home the cap or plug 40.

In operation, the piston chamber 13 is charged with fluid under pressure from the brake pipe 14 and fluid flows through the usual feed groove 30 around piston 15, charging valve chamber 16 and the pressure chamber 18.

In the release position of the equalizing piston 15, the piston chamber 2 is connected through passage 31 and cavity 32 in slide valve 19 with an application chamber 33 and also through cavity 34 with an exhaust port 35, so that the piston chamber 2 is open to the exhaust and the application and release piston is shifted to release position, in which the brake cylinder 7 is connected to the exhaust through valve chamber 4 and the exhaust ports 36.

If the brake pipe pressure is reduced in order to effect an application of the brakes, the equalizing piston 15 is operated to shift the main valve 19 and the graduating valve 20, so that the passage 31 is connected to port 37, and application chamber 33 is connected through passage 38, cavity 34, and passage 31, with piston chamber 2. Fluid is then supplied from valve chamber 16 and the pressure chamber 18 to piston chamber 2 and the application chamber 33 in the usual manner.

The piston 3, however, is not moved, until the pressure in piston chamber 2 has been increased sufficiently to overcome the resistance of spring 24, when the spring 24 is compressed and piston 21 is moved outwardly by the movement of piston 3, until the piston 21 engages the piston 23.

This movement closes the brake cylinder exhaust ports, but is not sufficient to open the supply port. As the pressure in piston chamber 2 is further increased, the resistance of spring 25 is overcome, and the piston 3 is moved, compressing spring 25, so as to open the supply port 41 to valve chamber 4. Fluid is then admitted to the brake cylinder to effect an application of the brakes.

When the brake cylinder pressure has been increased to a predetermined degree, the piston 23 moves to the limit of its outward travel, and any further increase in brake cylinder pressure up to the full equalizing point is not influenced by the action of the springs.

In releasing the brakes, fluid is vented from the piston chamber 2 upon movement of the equalizing piston 15 to release position and the piston 3 is then shifted by brake cylinder pressure toward release position. As the brake cylinder pressure is reduced, the spring 25 acts to shift the piston 23 to its inner position, but since the piston 21 still holds the weaker spring 24 compressed, the springs do not react to influence the release movement of the parts. When, however, the brake cylinder pressure has been reduced to a predetermined low degree, the spring 24 finally comes into action for the purpose of insuring the full movement of the application and release piston 3 to release position.

It will now be seen that the spring 25 acts as the brake application retarding spring, but by reason of the relative movement of the piston 3 with respect to the piston 23 which is necessary to open the brake cylinder release ports, the spring 25 does not act to interfere with or unduly hasten the release of the brakes. The release spring 24 is only of sufficient resistance to insure the final full movement of the piston 3 to release position and consequently does not come into action until the brake cylinder pressure has been reduced to a low degree.

Having now described my invention, what I claim as new and desire to secure by Letters Patent, is:

1. In a fluid pressure brake, the combination with a brake cylinder, of a valve device having a piston subject to the opposing pressures of the brake cylinder and an application chamber for controlling the application of the brakes and a resistance device subject to the opposing pressures of the brake cylinder and a spring and adapted upon a relative movement of said piston to oppose a further movement thereof.

2. In a fluid pressure brake, the combination with a brake cylinder, of a valve device having a piston subject to the opposing pressures of the brake cylinder and an application chamber for controlling the application of the brakes, a spring adapted upon a relative movement of the piston to oppose further movement thereof to application position, and a spring for assisting the release movement of said piston.

3. In a fluid pressure brake, the combination with a brake cylinder, of a valve device having a piston subject to the opposing pressures of the brake cylinder and an application chamber for controlling the application of the brakes, a spring adapted upon a relative movement of the piston to oppose further movement thereof to application position, and a relatively weaker spring for assisting the release movement of said piston.

4. In a fluid pressure brake, the combination with a brake cylinder, of a valve device having a piston subject to the opposing pressures of the brake cylinder and an application chamber for controlling the application of the brakes, a piston subject to the opposing pressures of the brake cylinder and a spring and adapted upon a relative movement of said piston to oppose a further movement thereof, and a piston subject to the opposing pressures of the brake cylinder and a spring for assisting the release movement of said piston.

In testimony whereof I have hereunto set my hand.

WALTER V. TURNER.